United States Patent [19]

Minks

[11] E Re. 29,245

[45] Reissued May 31, 1977

[54] VOLTAGE REGULATOR FOR ALTERNATING CURRENT LIGHTING SYSTEM

[76] Inventor: Floyd M. Minks, Rte. 1, Box 66, Kissimmee, Fla. 32741

[22] Filed: Feb. 23, 1976

[21] Appl. No.: 660,139

Related U.S. Patent Documents

Reissue of:

[64] Patent No.: 3,924,154
Issued: Dec. 2, 1975
Appl. No.: 417,773
Filed: Nov. 21, 1973

[52] U.S. Cl. ..... 315/78; 315/82; 315/310; 322/28; 323/8; 323/40

[51] Int. Cl.[2] ..... B60Q 1/08; G05F 1/44

[58] Field of Search ..... 307/252 N, 252 W; 315/307, 310, 78, 82; 322/28; 323/8, 19, 22 SC, 39, 40

[56] References Cited

UNITED STATES PATENTS

| | | | |
|---|---|---|---|
| 3,241,044 | 3/1966 | Mills | 323/22 SC |
| 3,469,177 | 9/1969 | Lorenz | 323/22 SC |
| 3,538,427 | 11/1970 | Oltendorf | 323/40 X |
| 3,641,397 | 2/1972 | Elliot et al. | 307/252 W |
| 3,742,337 | 6/1973 | Dignefpe | 323/39 X |
| 3,755,709 | 8/1973 | Minks | 315/78 X |
| 3,757,199 | 9/1973 | Minks | 322/28 |
| 3,790,856 | 2/1974 | Hutchinson | 323/8 X |

*Primary Examiner*—A. D. Pellinen
*Attorney, Agent, or Firm*—Duckworth, Hobby, Orman, Allen & Pettis

[57] ABSTRACT

A semi-conductor voltage regulator includes a dual transistor differential amplifier pair adapted to so as not to be damaged by reverse voltages during the application of either polarity of alternating current to the associated sensing network. The sensing network includes resistors, the value of which are selected to provide an offset current during one polarity of alternating current with respect to the other polarity. A diode is coupled with the differential amplifier transistor pair in order to protect those devices and the load from high, suddenly-applied or transient voltages generated externally or by internal switching within the regulator.

21 Claims, 3 Drawing Figures

VOLTAGE REGULATOR FOR ALTERNATING CURRENT LIGHTING SYSTEM

Matter enclosed in heavy brackets [ ] appears in the original patent but forms no part of this reissue specification; matter printed in italics indicates the additions made by reissue.

*BACKGROUND OF THE INVENTION*

The present invention relates to AC voltage regulators and more specifically to voltage regulators such as would be used on snowmobiles or motorcycles or other small vehicles where the headlamp and taillamp are normally operated directly from the coil of an alternator as opposed to the battery operated systems on most automobiles. Regulators for this purpose are described for example, in my prior U.S. Pat. Nos. 3,757,199; 3,755,685 and 3,755,709. While these systems have proved both workable and commercially practical, it is the purpose of the present invention to increase the accuracy and allow adaptation *of similar techniques* in applications such as for instance, with low voltage lamps, say typically 6 volt systems where applications of the previous art [ is more ] *has heretofore been* difficult. The amplifying circuits interposed between the RMS sensitive network and the shunt switching device *employed in the circuits shown* in the references just mentioned generally are limited to relatively little out-put and therefore require shunt switching devices of high input sensitivity. These circuits typically use an SCR of 3 milliamperes or less maximum gate current to fire, and in some cases, under 1 milliampere.

Circuits of the present invention are usable with more readily available and higher current SCR's, the practical gate sensitivity range approaching 10 milliamperes. Also, the calibration of the previously mentioned art is somewhat dependent upon the characteristics of the alternator supplying the power for the system, therefore in some cases, requiring different calibration points for use with different alternators to produce the same regulated voltage. Therefore, the further object of this invention is to produce a regulator with minimum sensitivity to the characteristics of the alternator being regulated.

In U.S. Pat. No. 3,755,709 note that the gate drive current for the SCR must flow through either R-1 or L which comprise a portion of the voltage sensing network of the regulator. This current *is* therefore reflected into the impedance of this sensing circuit node produces a voltage drop dependent upon the gate sensitivity of the SCR which varies from unit to unit and with temperature, thus producing unwanted deviation from ideal regulation. Also in that reference, the output of the bridge circuit is imposed directly across the base emitter junction of a transistor. This produces two undesirable effects. First, the well known temperature coefficient of the base emitter junction of a bipolar transistor produces a change in regulated voltage with temperature; secondly, since a finite voltage, say typically half of a volt, is required to bias on the base emitter junction, the bridge circuit does not operate at a true null, so the regulation point is dependent upon the RMS voltage applied as is desirable, but also somewhat upon the instantaneous peak applied to the bridge to produce sufficient output signal to drive this junction.

It is therefore the object of this invention to overcome both of these limitations. Also in the previous reference, the power sensitive impedance L is equally responsive to the positive and negative portions of the input waveform because R-1 is a linear resistor. It is another and further object of *the* present invention to make the response of the sensor slightly offset to favor one polarity of the waveform so as to reduce [ an ] *any* instability that might otherwise result at the point where the alternator has only slightly more output than required by the lamps or other loads connected.

Another and further object of the present invention is to reduce the requirements, and therefore chance of failure on the amplifying devices typified by the transistor in U.S. Pat. No. 3,755,709. As previously mentioned, considerable output is needed from the bridge circuit in that case requiring a fairly large voltage across L and R3. Therefore, with a rapid increase in the output of the alternator, sensor [ "L" ] *L'' may not* respond fast enough to prevent [ voltage ] *voltages* across the base emitter junction of the transistor, particularly in the reverse direction, from exceeding safe levels. For the same reasons, even during steady state [ operation ] *operations* a major portion of the alternator supply voltage will appear from the base to the collector of that transistor. As will be seen in the description of the subsequent figures, the voltage requirements are greatly reduced [ by the methods of ] *in accordance with* the present invention.

*It is a further object of this invention to reduce the number and complexity of the circuit elements required in prior art circuit solutions to the problems of AC voltage regulation. For example, the present invention utilizes the power from the AC waveform for energizing the sensing circuitry, whereas other prior art circuitry requires rectification of the AC into DC power for the sensing circuitry, as for example the disclosure of Oltendorf in U.S. Pat. No. 3,538,427.*

*See also the disclosures of Elliot et al in U.S. Pat. No. 3,641,397; Hutchinson in U.S. Pat. No. 3,790,856; Digniffe in U.S. Pat. No. 3,742,237; Mills in U.S. Pat. No. 3,241,044 and Lorenz in U.S. Pat. No. 3,469,177 and Minks in U.S. Pat. No. 3,755,709.*

THE DRAWING

*DETAILED DESCRIPTION*

Figure 1:
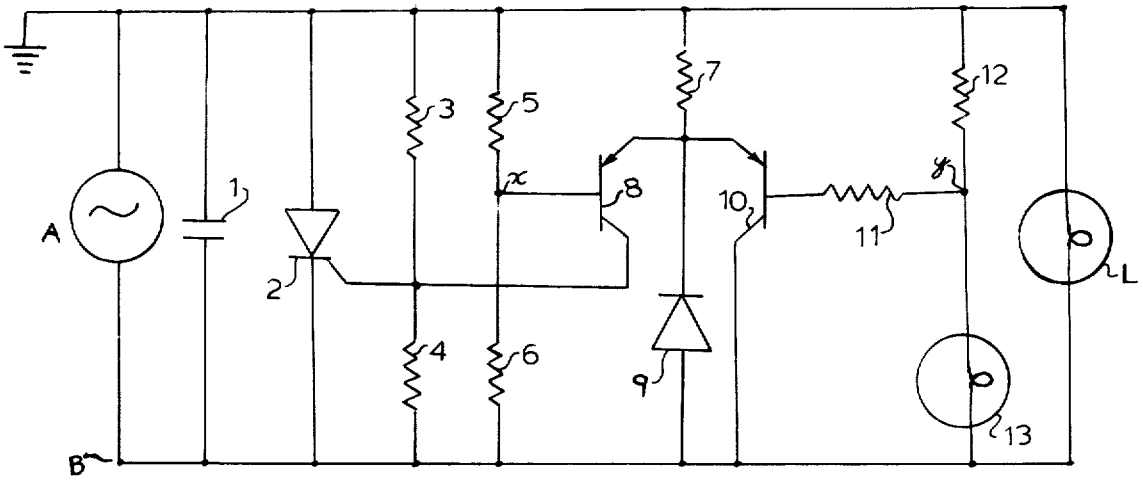
FIG. 1 is a first embodiment of a circuit in accordance with the present invention, utilizing a differential amplifier therein.

The invention will now be described with reference to the accompanying drawings, FIGS. 1, 2, and 3, which are circuit diagrams of three embodiments of the invention. The specific novel circuits described in reference to these three figures may not all be required in any specific application or a combination of them may be required in certain applications. While all of the figures show [a] *an RMS* power sensitive impedance in a bridge circuit as the sensing network, various other networks such as shown in U.S. Pat. No. 3,755,685 could be utilized or indeed entirely different networks such as *are* known in the art *may be utilized.* Other and further modifications and adaptations of this circuit should be obvious to those skilled in [the] *this* art. In all figures, similar numbers with primes and double primes represent components with similar functions. A represents an alternating current source of power such as might be a permanent magnet alternator on a snowmobile engine. The voltage, waveform, and frequency of such an alternator varies with the engine speed, preventing the use of regulation techniques based on a sinusoidal supply voltage. *The element* L represents the load to which the power or RMS voltage is to be controlled. Again, *in* the typical snowmobile application *the load L* will be predominantly lights. The other components are within the regulator assembly.

It should be realized that in general the wiring system of such a vehicle is much more complex than the simple parallel connection of an alternator and a lamp as shown here and would generally involve such things as switches for high beam and low beam, brake light switches, and other similar wiring. *Device* 1 is a capacitor by-passing the regulator lead to ground. In some applications this is necessary to prevent interference with the regulator from externally generated high frequency [ transient ] *transients*, such as from an ignition system, or in other cases to prevent switching transients from regulator components from generating radio interference which might be picked up on a radio mounted on [a] *the* vehicle. *Device* 2 represents a solid state control device shown by the accepted symbol for a silicon controlled rectifier. [It's] *The* current carrying anode and cathode terminals *of the control device 2* are connected directly in parallel with the alternator and *the* load so [as] *that* the *control* device [can acts ] *act* as a shunt regulator *for* controlling the voltage applied to the load when a control signal of *the* appropriate amplitude and phase is applied to its control or gate terminal.

Linear resistors represented by 5, 6, and 12, together with a non-linear device represented by 13, which may be a tungsten filament lamp, taken as a network act as a sensor for *the* AC or RMS voltage. These components should be understood together as representing a generalized network of four terminals with an input fed by voltage proportional to that voltage to be controlled, in this case connected directly across the alternator, and an output voltage or impedance in this embodiment represented by terminals X and Y which has a discernable characteristic change when the input voltage passes through the level at which it is desired to be regulated. In this case, this network is a bridge circuit arranged so that the output voltage phase and amplitude are controlled by the true RMS value of the applied waveform. Differential amplifiers typical of the arrangement of components 7, 8, and 10 are commonly used in *the* DC power supply art and will therefore not be described in great detail herein.

*With respect to the transistors 8 and 10 (or three port amplifying elements, in which the input terminal is the base, the output terminal is the collector and the common input-output terminal is the emitter) in the differential amplifier*, direct adaptation to alternating current circuitry [however,] presents *unique* problems with maintaining the inverse voltages on the junctions within acceptable limits. In the base emitter junction of a transistor even small reverse currents, [producing dissipations] *which induce dissipation* well below the dissipation capability of that junction in the forward direction, will cause permanent damage to the transistor. This is generally a progressive phenomenon first noted as a reduction in forward current transfer ratio, particularly at low current levels.

The usual approach is to rectify and filter the portion of the AC power available and use this to supply the transistors [,] . *See for example, U.S. Pat. No. 3,538,427.* However, this approach is generally too large physically and too expensive for practical commercial applications [to] *for* the type of circuitry being discussed here. *In the present embodiment, the power for operating the differential amplifier pair is the AC waveform power obtained directly from the alternator A without rectification.* Diode 9 connected from the alternator lead B to the emitters of the transistors *8 and 10* is used as a protective device to limit the inverse voltages *directly from the alternator A* across the base emitter junctions of transistors 8 and 10. When the ground point is negative compared to point B, current will flow through diode 9 and resistor 7. For normal circuit values voltage drop across the diode, if it is a typical silicon device, will be in the range of 0.7 volt while supplying current through resistor 7 of less than 100 milliamperes peak. Also the portion of the current flowing through diode 9 may flow in the forward direction through the base emitter junction of transistor 8 to point X, [thence] *then* through resistor 5 to ground, thus reducing the peak voltage across resistor 6 to typically 1.4 volts. Current may also flow through diode 9 *through* the emitter base junction of transistor 10 and *through* resistors 11 and 12 to ground. Note, however, with many commonly available transistors the foward voltage drop of the collector base junction will be sufficiently low that the predominant current path through resistor 11 will be directly from the collector to the base of transistor 10, still talking of course at an instant when the alternator output connected to ground is negative. Therefore in the typical case, conduction of current from the collector to the base of transistor 10 will limit the voltage on that base to a negative peak of approximately 0.7 *volts* compared to the alternator output lead B.

Thus it is seen that the inverse voltages imposed on the transistor junctions are at all times held well below the three to ten volt ratings of most commercially available transistors and this is true regardless *of* whether these inverse voltages tend to arise from current through the emitter supply resistor 7 or from a voltage differential across the input to this transistor pair represented *by* the points X and Y. If transistors 8 and 10 have similar transconductance versus temperature characteristics either because of selection or because of uniformity within the transistor type, this configuration becomes inherently temperature compensated. This will not be discussed in detail here because it is well understood and presented in the literature where this type of circuitry is applied to DC applications.

In the same [way] *manner*, input offset voltages between the terminals X and Y are, or can be, maintained to low levels by either selecting a match between these transistors or in the general case by use of transistors of a type that exhibit relatively little difference in these parameters from unit to unit. This allows use with sensors or networks as represented in this case by resistors 5, 6[,] *and* 12 and non-linear resistor 13 with much lower outputs [ and ] *than* would be possible with direct connection of the output, for instance to the base emitter junction of a transistor as shown in the previously mentioned patents. Several advantages arise from this. Circuitry can be readily adapted to 6 volt or even lower voltage lighting systems whereas the performance of the previous art tended to degrade rapidly below 12 volts RMS systems. Also, the operating point of the device 13 which may be typically a tungsten filament lamp can be much more arbitrarily chosen, therefore [, ] in some cases extending the lifetime of that component.

Described in another way, the use of the dual transistor configuration to replace the single transistor in the previous art reduces the component of the sensor output network signal between X and Y which is proportional to the instantaneous peak voltage on that network. This is because the normal operating output between points X and Y becomes very nearly zero voltage, instead of *approximately* the forward bias base emitter voltage of the transistor where a single transistor is used [.] , *as in the prior art.*

Ideally in an AC regulator under steady state or slowly changing alternator output conditions, the shunt switching or control device represented by 2, typically a silicon controlled rectifier, should fire at the same point in each succeeding cycle, that point or phase angle being determined by the difference in the power available from alternator A and the power required by load L. This exact and consistent phase relationship from cycle to cycle is generally obtained in such applications as motor speed controls or some industrial heating controls by relatively large and expensive networks of resistors and capacitors. Such techniques again may not be practical in this type of application because of cost and size limitations and possibly because of the temperature extremes inherent *therein.* The phasing in the circuit of FIG. 1 between the alternator signal A and the gate drive to SCR 2 is partially determined then by the thermal time constant of device 13 compared to the operating frequency of alternator A and partially by the phase component of the signal between X and Y as previously described. While this technique is simple and reliable, deviation from ideal performance may be sufficient to cause problems in some applications. This might most typically be noted as a flickering in lamp L particularly at the point where the output of alternator A is just slightly above the power required by lamp L. This typically results from a cyclic variation in the phase angle of the gating of device 2. In a typical situation, device 2 fires near the negative peak of voltage at point B on one cycle and might not fire at all for the following one, two or three cycles, and then the process is repeated.

As was previously described, the voltage required between points X and Y to drive the dual transistor configuration *represented by transistors 8 and 10,* is small compared to that of a single transistor, reducing one major cause of these sub-frequency variations. However, it is desirable to introduce a signal generally increasing with time from the beginning to the end of the time period when point B is negative with respect to ground, this being the time period when *the control* device 2 is capable of being turned on. This is done in the following manner: the thermal time constant of *non-linear* device 13 is not so much longer than the period of alternator A that there are absolutely no changes in the resistance of this device during the cycle.

[Therefore,] *If* the current passing through device 13, and therefore the power in it, is made slightly more responsive to one polarity of the output of alternator A than the other polarity, a temperature variation and therefore an output variation at the frequency of alternator A can be created. It should be pointed out that the desired size of this signal is very small compared to the normal signal out of [this] *the* device *13.* In the circuit of FIG. 1 this is created as follows: when point B is positive with respect to ground, as previously described, current can flow through diode 9 and emitter base junction of the device 10, or directly through the collector base junction of the device 10, and through resistor 11. This path effectively by-passes a portion of the current through resistor 12 around device 13. Generally, the value of resistor 11 compared to the normal operating resistance of device 13 can be selected to obtain the optimum ratio between sensitivity of device 13 to power during the different polarity half cycles without the impedance of resistor 11 being sufficiently high to effect the operation of transistor 10 during the period of the cycle when it is conducting. In a more general sense, the sensor is made to be slightly more responsive to one polarity of the applied AC signal than to the other and this in conjunction with the appropriately selected relationship between the sensor network time constant and the frequency of the alternator is used to produce a more stable phase relationship between the firing angle of SCR 2 and the alternator A. This technique can of course be applied to other than the power sensitive impedance *device* 13 or to other methods of sensing its operating condition and amplifying the resulting signal, than the methods shown by incorporating it in a bridge and using the common emitter [to] transistor configuration shown here.

Resistor 4 from the gate to the cathode of the switching device 2 is necessary with some types of devices to insure high temperature stability. Other types, however, do not require its use. Resistor 3 is not always required and would generally not be used unless resistor 4 was also used. The purpose of resistor 3 is to provide an alternate source of gate signal to device 2 which is always present above a predetermined instantaneous voltage from point B to ground. Conditions under which this would be desirable would be when alternator A may increase its output, such as by rapid acceleration of the engine to which is is attached, so rapidly that the time constant desirable for device 13 for steady *state* operation would not be sufficiently short to prevent a short term high value transient in the RMS voltage applied to the load *L.* An even worse example of this would be if a loose lead or connection existed in one of the leads from alternator A to the rest of the vehicle. Under such conditions as these, the peak responsive characteristics of the network consisting of components 2, 3 and 4 can be highly desirable, protecting the components of the regulator as well as the load. In some cases this can be accomplished with sufficient accuracy with 3 and 4 representing linear resistors [,] . However, even greater accuracy could be obtained with component 3 representing a zener diode or other non-linear device with a known and predetermined voltage breakdown characteristic. Protection for the first ½ cycle if point B is positive is not possible with an SCR, but is generally not necessary.

The current through device 3 is controlled only by the instantaneous alternator voltage and is not effected or controlled by the presence or absence of a signal through the path normally driving the gate of device 2, that is, through resistor 7 and transistor 8. This normal path through components 7 and 8 for the gate current of device 2 is not through any element of the sensing network in this figure represented by components 5, 6, 12 [,] and 13. Thus the impedance of these elements may be considerably higher than in the *prior* art [shown in] *represented by* U.S. Pat. No. 3,755,709, thus reducing the restraints on the selection of these components to fulfill their other requirements [,] and also reducing the error signals resulting therefrom. If diode 9 is replaced by a diode in series with resistor 7, the transistors *8 and 10* are still protected from reverse voltages arising from current flow through resistor 7. In this case, however, the various other impedances in the circuit, specifically 4, 5, 6, 11, 12 and 13, must be selected with such magnitude to ensure that the voltage between points X and Y does not exceed the junction breakdown capability of the devices. Also, the forward voltage drop of a diode in series with resistor 7 would subtract from the current available through transistor 8 to drive the gate of device 2 which might be significant at low instantaneous values of the voltage at point B. There would however, be the advantage that the average power dissipation in resistor 7 would be reduced to 50% or less of the value present in the circuit as shown.

Figure 2:
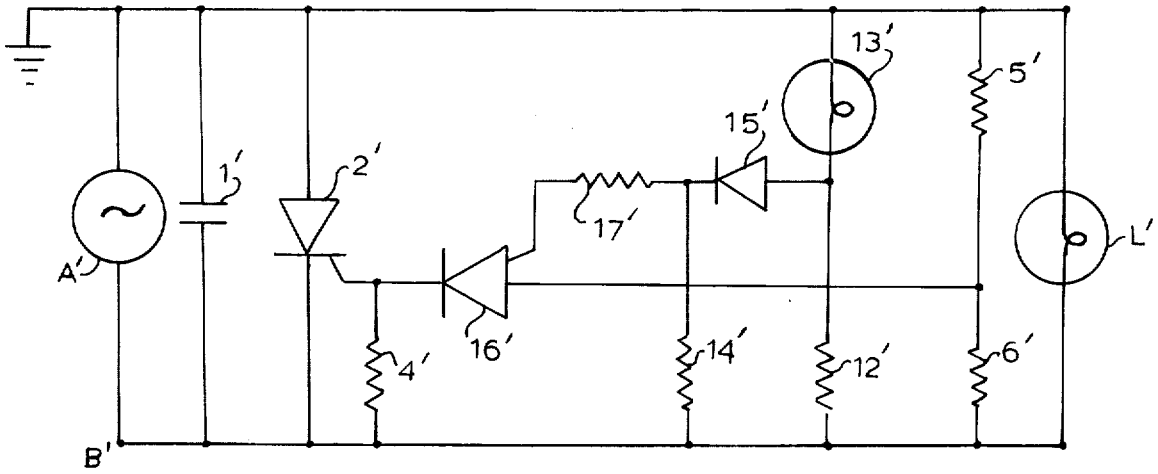
FIGS. 2 and 3 are alternate embodiments to the embodiment shown in FIG. 1, both in accordance with the present invention.

FIG. 2 is a circuit diagram of [another] *a second* embodiment of the invention. Components with similar functions are similarly numbered to FIG. 1 with the addition of a prime and their functions will not be described again. Semiconductor device 16′ shown as symbol commonly known as a complementary SCR is used as an amplifying and switching device. In more recent manufacturers literature these devices are also frequently called programmable unijunction transistors. In the general case, they can be made [up] of two interconnected bipolar transistors in the configuration generally shown in the literature as being the equivalent of a four layer switching device. This device serves as the amplification of the relatively low level signal available between points X′ and Y′ to produce the required signal to drive the gate of device 2′. The path of the gate current is predominantly through the resistor 5′ and device 16′, however if 16′ is a switching device as shown, and thus stays on once its gate or input signal level reaches a predetermined level, the errors [,] described as being eliminated in FIG. 1 by the gate current path being through device 7 rather than through the bridge, do not exist in the embodiment of FIG. 2. However, if device 16′ is replaced by a bipolar transistor, the impedances of device 5′, 6′, 12′ and 13′ would have to be low enough to supply the resulting base and emitter currents without resulting in unacceptably large errors. Diode 15′ and resistor 14′ perform a dual function. [The] *With respect to FIG. 1, the* first function is analagous to the decrease of the portion of current through 13 during the time B is positive by bypassing a portion of it through transistor 10 and resistor 11. In the case of FIG. 2, the current through [13] *13′* is increased during the opposite half cycle or when point B′ is negative with respect to ground by the path through diode 15′ and resistor 14′ which are parallel with the main current path through 12′. The second function is to cancel out the offset voltage and to a large extent the temperature coefficient of the input of device 16′, thus to a somewhat more limited extent device 16′ serves a function similar to transistor 8 in FIG. 1 and device 15′ serves a function similar to transistor 10 in FIG. 1.

Figure 3:
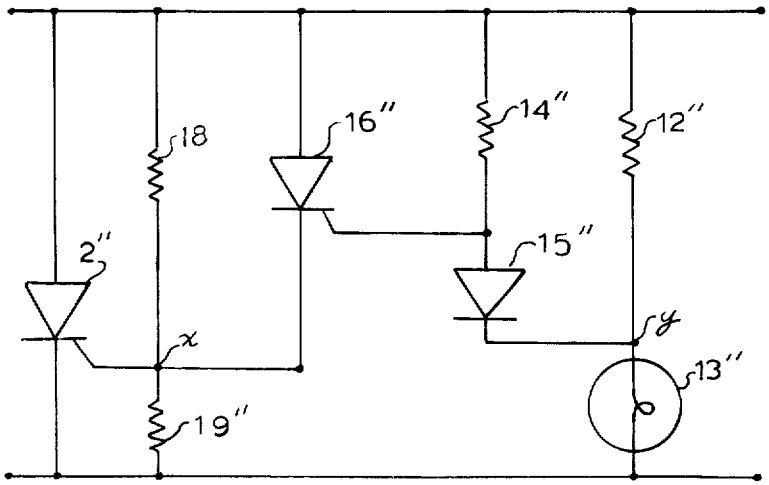

FIG. 3 is a circuit diagram of a portion of a similar regulator, similar numbers and double primes being used to denote components of similar functions. In this embodiment, resistor 18″ serves the dual purpose of both resistors 3 and 5 in FIG. 1 and resistor 19″ serves the dual purpose of both resistors 4 and 6 of FIG. 1. Device 16″ [,] shown as a silicon controlled rectifier is a switching device gated on by a positive signal on the gate, and thus allowing conduction from the anode to cathode. The analogy of devices 14′ and 15′ to those shown as 14″ and 15″ is direct, in that they serve both to unbalance the current flow from one-half of the cycle to the next in device 13″ and also to buck out and temperature compensate for the gate to cathode voltage required to turn on device 16″. Other modifications, combinations, or deletions of some of the functions described in these figures will be obvious to those skilled in the art in adapting this teaching to the requirements of a specific application, and all such being considered to fall within the spirit and scope of the invention as defined in the appended claims.

What is claimed is:

1. In a lighting system for use with an AC power producing source the frequency voltage, amplitude and waveform of which vary from time to time and having lighting means connected to be energized by the AC power supplied from said source:

a voltage sensitive network having terminals connected to be energized by the waveform of said source and having output terminals producing a signal dependent upon the true RMS voltage value of said source;

control means connected to control the flow of AC power from said source to said lighting means and having an input means;

two amplifying means each having an input terminal, an output terminal, and a common input-output terminal, the common input-output terminals of said amplifying means being connected together, the output terminal of one amplifying means supplying power to said input terminal of said control means;

said input terminals of said two amplifying means being connected to said output terminals of said true RMS voltage sensitive network to regulate the AC power supplied by said source to said lighting means;

impedance means for preventing destructive voltages and currents from appearing between said input terminals and said common input-output terminals of said amplifying means for either polarity of the waveform applied to said network to prevent the true RMS voltage supplied from said source to said lighting means from rising above a preselected value; and means to make said network slightly more sensitive to one polarity portion of the waveform of said source than to the other polarity portion.

2. A system for supplying AC power from a source to a lighting means, comprising:

a control means for varying the flow of AC power from said source to said lighting means;

a network sensitive to a true RMS voltage applied thereto and having an output, said network energized by the waveform of said source;

means to make said network slightly more sensitive to one polarity portion of the waveform of said source than to the other polarity portion;

means connecting the output of said network to said control means to regulate the AC power supplied by said source to said lighting means.

3. An AC vehicular power system including an engine-driven alternator and a lighting load to be energized therefrom;

a control means with an input means capable of limiting the AC voltage supplied from said alternator to said load in response to a signal at its input means;

a first true RMS voltage sensitive network energized by the waveform of said alternator and having a time constant longer than the period of the voltage produced by said alternator and having an output;

a second voltage sensitive network having a time constant shorter than the period of the voltage produced by said alternator and therefore primarily sensitive to peak voltages, and having an output;

means connecting said outputs of both said networks to the input of said control means to prevent the voltage of said system from exceeding predetermined voltages for longer than predetermined times; and means to make said network slightly more sensitive to one polarity portion of the waveform of said alternator than to the other polarity portion.

4. A system for supplying AC power from an engine-driven alternator source, the voltage, frequency, and waveform of which vary from time to time to a lamp load;

including a true RMS regulator;

said regulator containing a semi-conductor switching means connected to control the flow of power from said source to said load and having a gate terminal means;

a true RMS voltage sensitive network energized by the waveform of said alternator source and having terminals connected to said source and having output terminals;

a control signal path for connecting said output of said network to said gate, said path containing a semiconductor junction biased and connected so that the forward voltage drop thereof cancels with a similar drop inherent in other components of said regulator at the time when a gate signal is required to produce a stable RMS voltage to said load, whereby said regulator regulates the AC power supplied by said alternator source to said lamp load; and means for making said network slightly more sensitive to one polarity portion of the waveform of said alternator source than to the other polarity portion.

5. In a lighting system for use with an AC power producing source the frequency voltage, amplitude and waveform of which vary from time to time and having lighting means connected to be energized by the AC power supplied from said source:

a true RMS voltage sensitive network having terminals connected to be energized by the waveform of said source and having output terminals producing a signal dependent upon the RMS value of said source;

control means connected to control the flow of power from said source to said lighting means and having an input means;

two amplifying means each having an input terminal, an output terminal, and a common input-output terminal, the common input-output terminals of said amplifying means being connected together, the output terminal of one amplifying means supplying power to said input terminal of said control means;

said input terminals of said amplifying means being connected to said output terminals of said true RMS voltage sensitive network;

impedance means to prevent destructuve voltages and currents from appearing between said input terminals and said common input-output terminals of said amplifying means for either polarity of the waveform applied to said network to prevent the true RMS voltage supplied from said source to said lighting means from rising above a preselected value, to thereby regulate the AC power supplied by said source of said lighting means; and means for making said network slightly more sensitive to one polarity portion of the waveform of said source than to the other polarity portion.

6. The system of claim 5 wherein said source is an alternator attached to an engine of a vehicle.

7. The system of claim 6 wherein said amplifying means are transistors with their emitters connected together.

8. The system of claim 6 wherein said network contains a lamp with an impedance which varies with the power applied thereto.

9. The system of claim 8 wherein said source is an alternator attached to an engine of a vehicle and said lighting means are lamps associated with said vehicle.

*10. In a lighting system for use with an AC power producing source, the frequency, voltage, amplitude and waveform which vary from time to time, and having lighting means connected thereto to be energized by the AC power supplied from said source:*

*a voltage sensitive network having input terminals for being energized by the AC waveform of said source and having output terminals for producing a signal dependent upon the true RMS voltage value of said source;*

*control means for controlling the flow of AC power from said source to said lighting means, said control means operating responsive to a control signal at an input thereto;*

*two three-port amplifying means, each having an input terminal, an output terminal and a common input-output terminal, with said common input-output terminals of said three-port amplifying means being coupled together, said output terminal of one three-port amplifying means supplying said control signal to said input control means;*

*impedance means for preventing destructive reverse bias voltages and currents from appearing between said input terminals and said common input-output terminals of each of said three-port amplifying means from the AC waveform applied to said voltage sensitive network; and*

*said input terminals of each of said three-port amplifying means being coupled to said output terminals of said voltage sensitive network for operating said control means for preventing the true RMS voltage supplied from said AC power source to said lighting means from rising above a preselected value.*

*11. The AC power regulator as described in claim 10 wherein said source is an alternator attached to an engine of a vehicle.*

*12. The AC power regulator as described in claim 11 wherein said three-port amplifying means are transistors having emitters coupled together in a common emitter circuit.*

*13. The AC power regulator as described in claim 11 wherein said network contains a lamp having an impedance which varies with the power applied thereto.*

*14. The AC power regulator as described in claim 13 wherein said lamp has an incandescent filament having a resistance which increases with the power applied thereto.*

*15. The AC power regulator as described in claim 13 wherein said impedance means is a diode and said control means is a silicon controlled rectifier.*

*16. In a lighting system for use with an AC power producing source the frequency, voltage, amplitude and waveform of which vary from time to time, said AC source being coupled to lighting means for being energized thereby, said lighting system comprising:*

*a true RMS voltage sensitive network having terminals connected to be energized by the AC waveform of said source and having output terminals for producing a signal dependent upon the true RMS value of the voltage from said source;*

*control means for controlling the flow of power from said source to said lighting means, said control means having an input thereto;*

*two amplifying means each having an input terminal, an output terminal and a common input-output terminal, said common input-output terminals of said amplifying means being coupled together, said output terminal of one of said amplifying means supplying power to said input of said control means, said input terminals of said amplifying means being coupled to said output terminals of said true RMS voltage sensitive network;*

*impedance means for bypassing destructive voltages and currents from between said input terminals and said common input-output terminals of said amplifying means from the AC waveform applied to said network, thereby preventing the RMS voltage supplied from said source to said lighting means from exceeding a predetermined value.*

*17. An AC voltage regulator for use in regulating the RMS power supplied to a load from an AC voltage source, said AC voltage regulator comprising:*

*control means having a variable impedance for controlling the instantaneous voltage from said AC voltage source to said load, said control means operating responsive to signals to an input terminal thereof;*

*a first network for producing across output terminals thereof an output signal responsive to the RMS AC voltage from said AC voltage source to said load;*

*a first and a second amplifier each having an input terminal, an output terminal and a common input-output terminal, said common input-outpt terminals coupled together at a first junction point, with said first and second amplifiers coupled to said AC voltage source for receiving AC power therefrom, with said input terminals of said first and second amplifiers coupled to said output terminals of said first network, and with said output terminal of at least one of said first and second amplifiers coupled to said input terminal of said control means for regulating the RMS power supplied to said load;*

*a resistance interposed between a first terminal of said AC voltage source and said first junction point; and*

*a rectifying device interposed between said first junction point and a second terminal of said AC voltage source for conducting current therethrough when the AC voltage between said first and second terminals of said AC voltage source reverse biases said first and second amplifiers into a generally non-amplifying mode.*

*18. The AC voltage regulator as described in claim 17 wherein said control means is coupled across said first and second terminals of said AC voltage supply as a shunt regulator.*

*19. The AC voltage regulator as described in claim 18 wherein said control means is a silicon controlled rectifier.*

*20. The AC voltage regulator as described in claim 18 wherein said first network comprises a balance bridge network having a first and a second leg coupled in parallel between said first and second terminals of said AC voltage source, said first leg having elements therein for responding to the instantaneous voltage from said AC voltage source, and said second leg having elements therein for responding to the AC RMS voltage from said AC voltage source.*

*21. The AC voltage regulator as described in claim 20 wherein one of said elements in said second leg of said bridge network comprises an incandescent filament of a light emitting device of a type having a thermal time constant greater than the frequency of the AC voltage source.*

* * * * *